United States Patent
Gross et al.

(10) Patent No.: US 7,725,292 B2
(45) Date of Patent: May 25, 2010

(54) OPTIMAL STRESS EXERCISER FOR COMPUTER SERVERS

(75) Inventors: Kenny C. Gross, San Diego, CA (US); Ramakrishna C. Dhanekula, San Diego, CA (US); Kalyanaraman Vaidyanathan, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 25 days.

(21) Appl. No.: 11/874,073

(22) Filed: Oct. 17, 2007

(65) Prior Publication Data

US 2009/0106600 A1    Apr. 23, 2009

(51) Int. Cl.
*G06F 11/30* (2006.01)
*G21C 17/00* (2006.01)

(52) U.S. Cl. ...................................................... 702/182

(58) Field of Classification Search ................. 702/108, 702/117, 182–186, 130–132, 118, 119, 121, 702/81; 374/100–103
See application file for complete search history.

(56) References Cited

U.S. PATENT DOCUMENTS

| | | | | |
|---|---|---|---|---|
| 7,162,393 | B1 * | 1/2007 | Vacar et al. | 702/183 |
| 7,483,816 | B2 * | 1/2009 | Gross et al. | 702/182 |
| 2007/0136024 | A1 * | 6/2007 | Moser et al. | 702/119 |
| 2007/0208538 | A1 * | 9/2007 | Gross et al. | 702/182 |
| 2007/0291390 | A1 * | 12/2007 | Vaidyanathan et al. | 360/53 |
| 2008/0255710 | A1 * | 10/2008 | Vaidyanathan et al. | 700/300 |
| 2008/0255785 | A1 * | 10/2008 | Gross et al. | 702/79 |
| 2008/0255807 | A1 * | 10/2008 | Gross et al. | 702/186 |
| 2009/0006066 | A1 * | 1/2009 | Behm et al. | 703/15 |

* cited by examiner

*Primary Examiner*—Michael P Nghiem
(74) *Attorney, Agent, or Firm*—Park, Vaughan & Fleming LLP

(57) ABSTRACT

A system that select tests to exercise a given computer system is described. During operation, the system tests the given computer system using a set of tests, where a given test includes a given load and a given cycling time selected from a range of cycling times. Moreover, for the given test, the system monitors a stress metric in the given computer system. Additionally, the system selects at least one of the tests from the set of tests to exercise the given computer system based on the monitored stress metric.

16 Claims, 8 Drawing Sheets

```
                                                                    ┌─ 200
┌─────────────────────────────────────────────────────────────┐
│  TEST A COMPUTER SYSTEM USING A SET OF TESTS, WHERE A GIVEN │
│  TEST INCLUDES A GIVEN LOAD AND A GIVEN CYCLING TIME        │
│  SELECTED FROM A RANGE OF CYCLING TIMES                     │
│                            210                              │
└─────────────────────────────────────────────────────────────┘
                                │
                                ▼
┌─────────────────────────────────────────────────────────────┐
│  FOR THE GIVEN TEST, MONITOR A STRESS METRIC IN THE         │
│  COMPUTER SYSTEM                                            │
│                            212                              │
└─────────────────────────────────────────────────────────────┘
                                │
                                ▼
┌─────────────────────────────────────────────────────────────┐
│  SELECT AT LEAST ONE OF THE TESTS FROM THE SET OF TESTS TO  │
│  EXERCISE THE COMPUTER SYSTEM BASED ON THE MONITORED        │
│  STRESS METRIC                                              │
│                            214                              │
└─────────────────────────────────────────────────────────────┘
```

FIG. 2A

OPTIMAL STRESS EXERCISER FOR COMPUTER SERVERS

RELATED APPLICATION

This application is related to a pending U.S. patent application entitled, "Length-of-the-Curve Stress Metric for Improved Characterization of Computer System Reliability," by inventors Kenny C. Gross, Keith A. Whisnant, and Ayse K. Coskun, having Ser. No. 11/787,533, now U.S. Pat. No. 7,483,816 and filing date Apr. 16, 2006, which is hereby incorporated by reference.

BACKGROUND

1. Field of the Invention

The present invention relates to techniques for testing computer systems. More specifically, embodiments of the present invention relate to a technique for determining an optimal stress test or combination of stress tests to characterize computer-system reliability.

2. Related Art

Many precursors of component failures in computer systems, as well as the associated failure mechanisms, can only be determined by applying a stressful load onto the computer systems. For example, the stressful load may be applied for a period of time (typically, between a few hours and 24 hrs) in an attempt to trigger a fault. This technique is often used during root-cause analysis (RCA) and to confirm intermittent failures in computer systems that are returned by customers. Typically, a variety of stress tests are used for these purposes, each of which applies a different load, and thereby stresses different components in a given computer system.

During many of these stress tests, such as during an RCA for problems on system boards, the underlying effect of interest is temperature dynamics, which can trigger subtle failure mechanisms that cause intermittent failures. For example, these failure mechanisms may include: solder fatigue, interconnect fretting, delamination of bonded components, stresses caused by non-coplanarity of stacked components, and/or deterioration of connectors. Some stress tests are known to cause the temperatures of processors (or processor cores) and ASICs to go up significantly (for example, by 6-12 C). Moreover, temperature cycling accelerates the aforementioned failure mechanisms even more, because many of these failure mechanisms are associated with the cumulative effect of temperature cycling and temperature gradients in the computer systems.

Unfortunately, existing stress tests do not efficiently increase the occurrence of many of the failure mechanisms that affect computer systems. Moreover, for a given stress test and/or failure mechanism, the optimal test conditions for a given computer system are typically not known. Consequently, stress tests are often performed for a long time or on a large population of suspected computer systems in an attempt to trigger sufficient failures to enable proper RCA.

Hence, what is needed is a technique for characterizing stress tests to determine the optimal stress test and/or combinations of stress tests, as well as the associated test conditions, without the above-described problems.

SUMMARY

One embodiment of the present invention provides a system for selecting tests to exercise a given computer system. During operation, the system tests the given computer system using a set of tests, where a given test includes a given load and a given cycling time selected from a range of cycling times. Moreover, for the given test, the system monitors a stress metric in the given computer system. Additionally, the system selects at least one of the tests from the set of tests to exercise the given computer system based on the monitored stress metric.

In some embodiments, the given cycle time for the given load can include an idle time, during which the given load is not executed.

In some embodiments, the given load includes an application. Moreover, the application may be configured to stress a portion of the given computer system, which can include: a processor, memory, an application-specific integrated circuit, an input/output interface, and/or a disk drive.

In some embodiments, the selected test corresponds to the worst-case monitored stress metric. Moreover, the selected test may be used during reliability or failure-analysis testing of the given computer system.

In some embodiments, tests are selected for different types of computer systems, and where a given selected test is subsequently used for a given type of computer system.

In some embodiments, the stress metric includes thermal dynamics of the given computer system. Moreover, the stress metric may be determined from temperature samples measured at different locations in the given computer system. Additionally, in some embodiments at least some of the temperature samples are multiplied by an associated weight when determining the stress metric.

In some embodiments, the determination of the stress metric involves: computing a length of a line between adjacent temperature samples, where the line includes a component that is proportionate to a difference between values of the adjacent temperature samples and a component that is proportionate to a time interval between the adjacent temperature samples; and adding the computed length to a cumulative length variable, which is used as the stress metric.

Moreover, the computed length may be adjusted based on a function of the magnitude of the adjacent temperature samples. For example, the adjustment may involve multiplying the length of the lines by an associated weight.

In some embodiments, computing the length of the line between adjacent temperature samples involves computing $\sqrt{|S_1-S_2|^2+t^2}$, where $S_1$ and $S_2$ are magnitudes of the adjacent temperature samples and t is the magnitude of the time interval between the adjacent temperature samples.

In some embodiments, the temperature samples are measured at pre-determined time intervals.

Another embodiment provides a method including at least some of the above-described operations.

Another embodiment provides a computer program product for use in conjunction with the system.

BRIEF DESCRIPTION OF THE FIGURES

FIG. 2A is a flow chart illustrating a process for selecting tests to exercise a computer system in accordance with an embodiment of the present invention.

Figure 1:
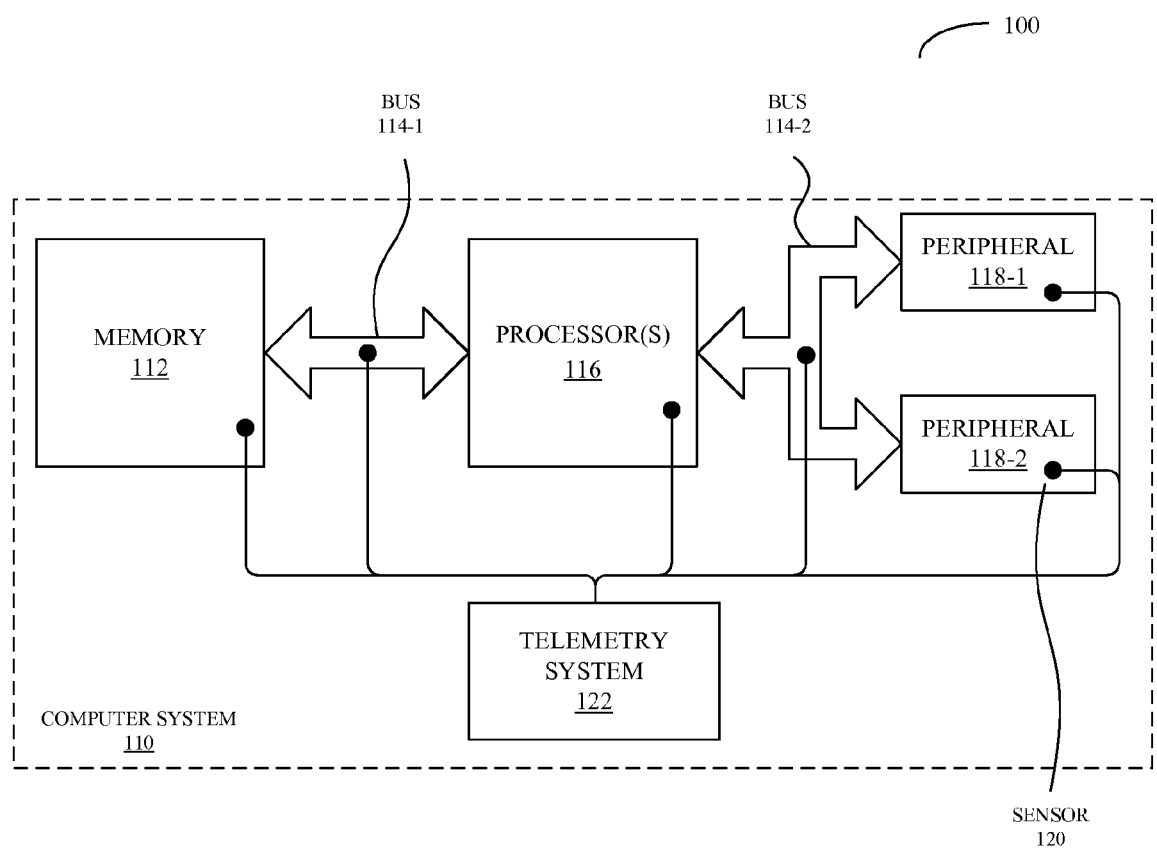
FIG. 1 is a block diagram illustrating a computer system in accordance with an embodiment of the present invention.

Table 1 provides stress-test combinations and associated cycling times for use in selecting tests to exercise a computer system.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a system, a method, and a computer program product (i.e., software) for use with the system are described. These systems and processes may be used to determine an optimal combination of stress tests and associated cycling times for a given computer system. In particular, while there are a wide variety of stress tests, selecting the appropriate stress test(s) and test conditions for a particular failure mechanism, type of computer, or even for a given application (such as one that is I/O intensive versus one that is processor intensive) that is to execute on the given computer is often ad hoc. Consequently, the stress test(s) used during qualification, 'burn-in,' and/or RCA is often sub-optimal, and therefore, often does not achieve the worst-case thermal dynamics in the given computer system.

In the discussion that follows, different combinations of stress tests and associated cycling times (e.g., how long they are run) are used in conjunction with a stress metric to identify the optimal stress test (or combination of stress tests), including the test conditions (such as the cycling time). In some embodiments, the stress metric is based on system-telemetry measurements in the given computer system, such as temperature measurements. Moreover, data obtained in these temperature measurements may be analyzed to generate a cumulative length-of-curve (LOC) value, which summarizes the thermal dynamics during a given stress test.

Note that system-telemetry data and the results of the stress tests may be received and transmitted over a network, such as: the Internet or World Wide Web (WWW), an Intranet, a local area network (LAN) (such as IEEE 802.11 or WiFi), a wide area network (WAN) (such as IEEE 802.16 or WIMAX), a metropolitan area network (MAN), a satellite network, a wireless network (such as a cellular telephone network), an optical network, and/or a combination of networks or other technology enabling communication between computing systems or electronic devices.

We now describe embodiments of a system, a method, and software for selecting stress tests to exercise the given computer system. For rapid RCA of a wide class of failure mechanisms in computer systems, escalation engineering teams have traditionally executed stress tests (which are also referred to as loads or exerciser scripts) onto the suspect computer systems in an effort to accelerate the intermittent failure mechanism so that the failure mode can be reproduced and the root cause can be established.

In general, given an available group of stress tests, such as those provided in a Validation Test Suite, the selection of the stress test(s) to run is often based on anecdotal success stories or subjective personal preference(s). For example, a particular stress test that worked well in identifying an earlier failure mechanism may be used to try to identify an as-yet-unknown failure mechanism. Unfortunately, quantitative metrics of the relative effectiveness of the various stress tests, which can be used pick the best one(s) or to determine how best to use the various stress tests, are typically not available.

Moreover, a wide variety of fundamental questions associated with stress tests remain unanswered. For example:
  If a given stress test is cycled on and off with a cycling period or time of P minutes, is the resulting stress level (in terms of the resulting thermal dynamics) larger than if this stress test were run continuously for X hours?
  If the cycling period P were made shorter or longer, does the stress level increase?
  If two stress tests are executed simultaneously or concurrently, is the stress level larger than if either stress test is run alone?
  If three stress tests are executed simultaneously or concurrently, is the stress level larger than that achieved by running either one alone, or by running different combinations of stress tests?
  If these stress tests are cycled simultaneously or concurrently with cycling periods or times $P_1$, $P_2$, and $P_3$, are there optimal values for these cycling times to produce a maximum thermal-dynamic stress level on system boards in the given computer system (for example, during RCA analysis)?

In the discussion that follows, a systematic parametric technique is provided. This technique leverages continuous system-telemetry data to answer these questions and, for an arbitrary computer system (such as a server), to identify the optimal combination of available stress tests or exercisers and cycling times or periods that produce the maximal thermal-dynamic stress levels. Note that this optimal combination may be used to: enhance RCA of suspect computer systems during stress testing; improve accelerated lifetime studies of computer systems (such as servers) during qualification testing; improve burn-in testing; shorten testing times, which can lead to higher throughput at repair centers and remanufacturing facilities.

In particular, the cumulative LOC value, which measures the degree of thermal cycling during dynamic load variations in the given computer system, is used as a figure of merit to compare the various stress tests. Note that if the given stress test causes temperatures to fluctuate, the cumulative LOC value is larger. Moreover, if the peak-to-peak amplitudes are greater, the cumulative LOC value is even higher. Additionally, if the frequency of temperature variations is higher, the cumulative LOC value goes up even faster.

Moreover, a parametric sensitivity investigation is performed, which iteratively varies multitude parameters that are known to produce thermal stress in computer systems, including: permutations of stress tests or load types (such as processor tests or bus tests, which generate the highest temperatures for the processor(s) and/or ASICs.); and permutations of cycling times, which are plateau levels during which a given stress test or load type is held at full intensity. In this way, the optimal stress test or combinations of stress tests (i.e., the stress test(s) that corresponds to the worst-case monitored stress metric, such as the worst-case cumulative LOC value) for the given computer system or, more generally, for a type of computer system or platform can be identified. Note that this optimal stress test or combination of stress tests may be subsequently used during reliability or failure-analysis testing of the given computer system.

In some embodiments, the given stress test or load type includes an application. Moreover, the application may be configured to stress a portion of the given computer system, which can include: a processor, memory, an ASIC, an I/O interface, and/or a disk drive. Additionally, stress tests may be selected for different types of computer systems, where a given selected stress test is subsequently used for a given type of computer system.

We now describe embodiments of system-telemetry monitoring in the given computer system. FIG. 1 illustrates an embodiment 100 of a computer system 110, which can be the given computer system. Computer system 110 includes processor(s) (or processor cores) 116, memory 112, and peripherals 118. Note that processor(s) 116 can be any type of processor(s) that executes program code.

Memory 112 contains data and program code for processor(s) 116 and is coupled to processor(s) 116 through bus 114-1, which provides a communication channel between processor(s) 116 and memory 112. Moreover, peripherals 118 can be any type of peripheral components, such as video cards, interface cards, or network cards. Note that bus 114-2 provides a communication channel between processor(s) 116 and peripherals 118.

Although we use computer system 110 for the purposes of illustration, embodiments of the present invention can be applied to other systems, such as: desktop computers, workstations, embedded computer systems, laptop computer systems, servers, networking components, peripheral cards, handheld computing devices, automated manufacturing systems, and many other computer systems. Moreover, embodiments of the present invention can be applied to individual chips, components comprised of multiple chips, field-replaceable units (FRUs), or entire systems.

In some embodiments, computer system 110 includes telemetry system 122. This telemetry system is coupled through a telemetry harness to a number of sensors, such as sensor 120, on components in computer system 110. Telemetry system 122 uses the sensors to sample system performance metrics, which can then be used to determine the performance of the associated components and/or the computer system 110. For example, telemetry system 122 can sample physical system performance metrics, such as: temperatures, relative humidity, cumulative or differential vibrations, fan speed, acoustic signals, currents, voltages, time-domain reflectometry readings, and/or miscellaneous environmental variables. In some embodiments, the sensors, such as temperature sensors, are sampled or measured at pre-determined time intervals.

Moreover, telemetry system 122 can separately or additionally use software sensors to sample software system performance metrics, such as: system throughput, transaction latencies, queue lengths, load on the processor(s) 116, load on the memory 112, load on the cache, I/O traffic, bus saturation metrics, FIFO overflow statistics, and/or various other system performance metrics gathered from software.

Note that in some embodiments computer system 110 includes fewer or additional components. Moreover, two or more components may be combined into a single component and/or a position of one or more components may be changed.

We now describe embodiments of processes for selecting tests to exercise the given computer system. FIG. 2A presents a flow chart illustrating an embodiment of a process 200 for selecting tests to exercise a given computer system, which can be implemented by the system. During operation, the system tests the given computer system using a set of tests (210), where a given test includes a given load and a given cycling time selected from a range of cycling times. Moreover, for the given test, the system monitors a stress metric in the given computer system (212). Additionally, the system selects at least one of the tests from the set of tests to exercise the given computer system based on the monitored stress metrics (214).

Figure 2B:
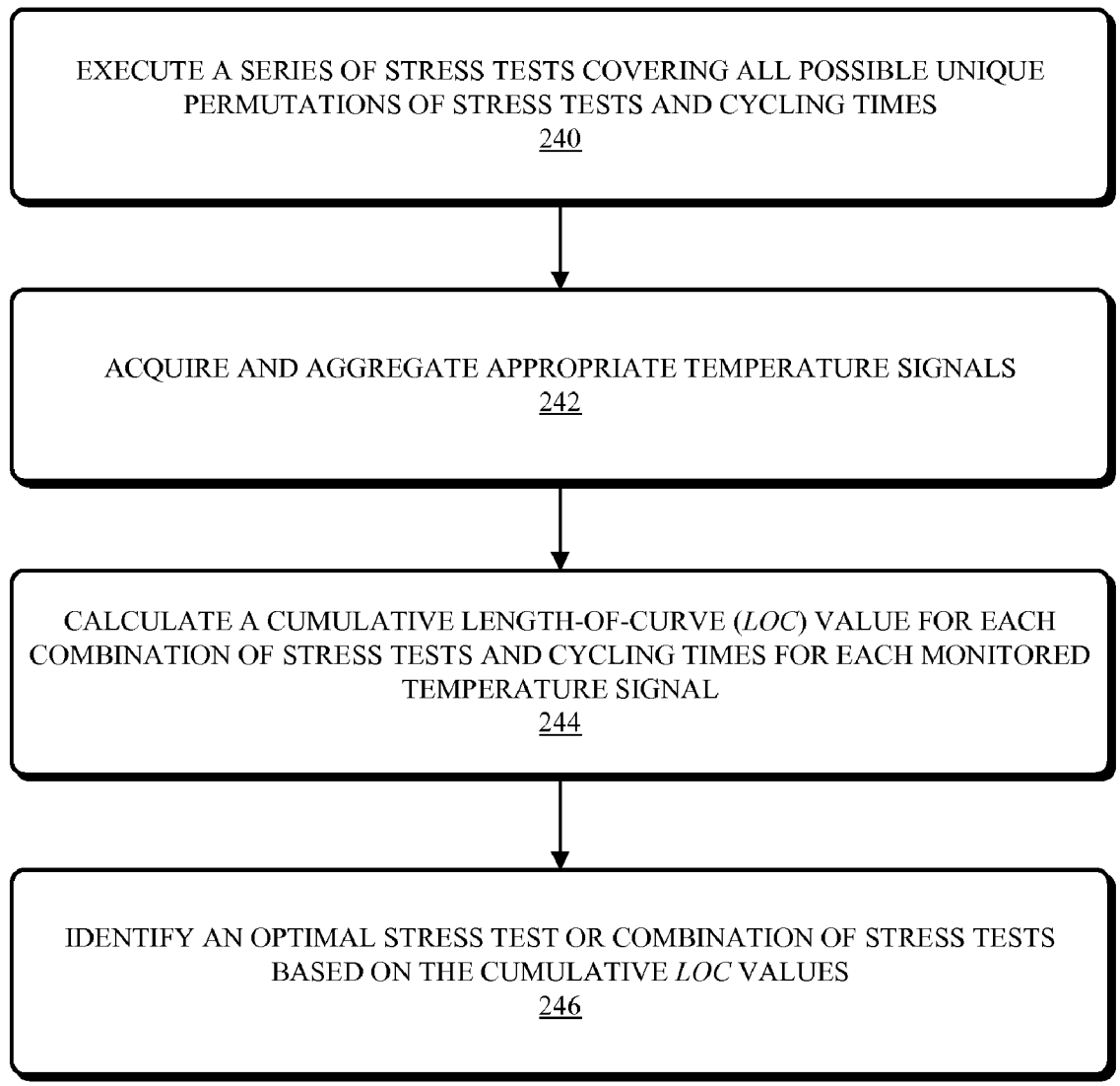
FIG. 2B is a flow chart illustrating a process for selecting tests to exercise a computer system in accordance with an embodiment of the present invention.

FIG. 2B presents a flow chart illustrating an embodiment of a process 230 for selecting tests to exercise the given computer system, which can be implemented by system. During operation, the given computer system executes a series of stress tests covering all possible unique permutations of stress tests and cycling times (240). Next, the system acquires and aggregates appropriate temperature signals (242) in the given computer system.

Using each of the monitored temperature signals, the system calculates the cumulative LOC value for each combination of stress tests and cycling times (244). Then, the system identifies the optimal stress test or combination of stress tests based on the cumulative LOC values (246).

In an exemplary embodiment, the given computer system executes a systematic matrix of permutations on combinations of the three stress tests that generate the highest temperatures for the processor and/or ASIC, in conjunction with a range of associated cycle times $P_1, P_2, P_3$ (which can include idle, i.e., the given stress test is not performed). While these combinations are executed, telemetry system 122 (FIG. 1) collects temperature data in the given computer system. Next, the system analyzes this data to generate corresponding cumulative LOC values, the largest of which identifies the optimal stress-test combination (including the associated cycling times), i.e., the combination that results in the maximum thermal dynamics that can be achieved for the given computer system.

Note that there is an intuitive temptation to use the minimum cycling time as much as possible in an attempt to increase the frequency of thermal fluctuations. However, because of thermal inertia, there is a limit to how fast the actual temperature inside the given computer system will cycle. Using system-telemetry data, the point at which diminishing returns occur, e.g., the point at which a further reduction in the cycling time starts produces smaller amplitude temperature cycles, for a given stress test can be determined.

Table 1 lists various stress-test combinations and associated cycling times for use in selecting tests to exercise the given computer system. Note that the optimal combination is number 46, with a $P_1$ of 20 minutes for stress test A (Linpack), a $P_2$ of 30 minutes for stress test B (Bus Test), and a $P_3$ of 30 minutes for stress test C (CPU Test). Also note that the 'idle' label indicates that a given stress test in a given combination is not performed.

TABLE 1

| Combination | Stress Test A Cycling Time $P_1$ (minutes) | Stress Test B Cycling Time $P_2$ (minutes) | Stress Test C Cycling Time $P_3$ (minutes) | Cumulative LOC Value |
|---|---|---|---|---|
| 1 | 30 | Idle | Idle | 64.49 |
| 2 | 20 | Idle | Idle | 65.46 |
| 3 | 10 | Idle | Idle | 69.48 |
| 4 | Idle | 30 | Idle | 81.12 |
| 5 | Idle | 20 | Idle | 80.84 |
| 6 | Idle | 10 | Idle | 65.10 |
| 7 | Idle | Idle | 30 | 63.32 |

TABLE 1-continued

| Combination | Stress Test A Cycling Time $P_1$ (minutes) | Stress Test B Cycling Time $P_2$ (minutes) | Stress Test C Cycling Time $P_3$ (minutes) | Cumulative LOC Value |
|---|---|---|---|---|
| 8 | Idle | Idle | 20 | 63.23 |
| 9 | Idle | Idle | 10 | 69.2 |
| 10 | 30 | 30 | Idle | 80.98 |
| 11 | 30 | 20 | Idle | 81.07 |
| 12 | 30 | 10 | Idle | 69.63 |
| 13 | 20 | 30 | Idle | 81.58 |
| 14 | 20 | 20 | Idle | 76.76 |
| 15 | 20 | 10 | Idle | 72.98 |
| 16 | 10 | 30 | Idle | 88.02 |
| 17 | 10 | 20 | Idle | 79.64 |
| 18 | 10 | 10 | Idle | 69.02 |
| 19 | 30 | Idle | 30 | 66.02 |
| 20 | 30 | Idle | 20 | 65.56 |
| 21 | 30 | Idle | 10 | 65.61 |
| 22 | 20 | Idle | 30 | 66.16 |
| 23 | 20 | Idle | 20 | 64.45 |
| 24 | 20 | Idle | 10 | 64.14 |
| 25 | 10 | Idle | 30 | 64.35 |
| 26 | 10 | Idle | 20 | 64.11 |
| 27 | 10 | Idle | 10 | 70.26 |
| 28 | Idle | 30 | 30 | 81.72 |
| 29 | Idle | 30 | 20 | 80.62 |
| 30 | Idle | 30 | 10 | 79.49 |
| 31 | Idle | 20 | 30 | 77.29 |
| 32 | Idle | 20 | 30 | 77.95 |
| 33 | Idle | 20 | 30 | 79.04 |
| 34 | Idle | 10 | 30 | 73.48 |
| 35 | Idle | 10 | 30 | 74.57 |
| 36 | Idle | 10 | 30 | 73.94 |
| 37 | 30 | 30 | 30 | 73.13 |
| 38 | 30 | 30 | 20 | 72.58 |
| 39 | 30 | 30 | 10 | 74.85 |
| 40 | 30 | 20 | 30 | 77.56 |
| 41 | 30 | 20 | 20 | 75.65 |
| 42 | 30 | 20 | 10 | 74.72 |
| 43 | 30 | 10 | 30 | 73.14 |
| 44 | 30 | 10 | 20 | 73.74 |
| 45 | 30 | 10 | 10 | 77.25 |
| 46 | 20 | 30 | 30 | 89.83 |
| 47 | 20 | 30 | 20 | 68.1 |
| 48 | 20 | 30 | 10 | 65.5 |
| 49 | 20 | 20 | 30 | 63.97 |
| 50 | 20 | 20 | 20 | 64.42 |
| 51 | 20 | 20 | 10 | 64.05 |
| 52 | 20 | 10 | 30 | 64.43 |
| 53 | 20 | 10 | 20 | 64.08 |
| 54 | 20 | 10 | 10 | 64.00 |
| 55 | 10 | 30 | 30 | 65.19 |
| 56 | 10 | 30 | 20 | 63.69 |
| 57 | 10 | 30 | 10 | 65.62 |
| 58 | 10 | 20 | 30 | 65.78 |
| 59 | 10 | 20 | 20 | 64.16 |
| 60 | 10 | 20 | 10 | 64.38 |
| 61 | 10 | 10 | 30 | 64.39 |
| 62 | 10 | 10 | 20 | 64.88 |
| 63 | 10 | 10 | 10 | 63.86 |

We now describe the determination of cumulative LOC values from system-telemetry temperature data. Embodiments of the present invention use samples of a system performance metric to generate a stress metric that provides a continuous quantitative indicator of the cumulative stress that a computer chip, component, FRU, or computer system has experienced during a given combination of stress tests. (In order to simplify the following description, we refer to computer chips, components, or FRUs as 'computer system components.') This cumulative stress metric or LOC value provides a measure of the thermal stress during the given combination of stress tests.

Although in the following discussion, temperature is used as a parameter in computing the cumulative LOC value, in alternative embodiments, other parameters can be monitored using the LOC technique. For example, the LOC technique can be used to monitor physical performance parameters such as: relative humidity, cumulative or differential vibrations, fan speed, acoustic signals, currents, voltages, time-domain reflectometry readings, and/or miscellaneous environmental variables. Similarly, the LOC technique can be used to monitor software performance metrics such as: system throughput, transaction latencies, queue lengths, the load on the processor(s) 116 (FIG. 1), the load on the memory 112 (FIG. 1), the load on the cache, I/O traffic, bus saturation metrics, FIFO overflow statistics, and/or various other system performance metrics gathered from software. Furthermore, the LOC technique can be used to monitor combined system performance parameters, such as a computer-system temperature in combination with the load on the processor(s) 116 (FIG. 1).

Assuming that data is collected from temperature sensors with a sampling interval of t, a differential LOC value for two consecutive temperature measurements $T_1$ and $T_2$ is computed as:

$$\text{Differential LOC Value} = \sqrt{|T_1 - T_2|^2 + t^2}.$$

As discussed below, the computed length may be adjusted based on a function of the magnitude of the adjacent temperature samples. For example, the adjustment may involve multiplying the length of the lines by an associated weight. In particular, because higher temperatures increase the thermal stress experienced by the given computer system (or by components in the given computer system), at least some of the differential LOC values can be adjusted to differentiate between different temperature offsets by multiplying the differential LOC value by a weight factor (W).

In some embodiments, an exponential function is used for W. This reflects the fact that computer systems experiencing temperatures higher than critical thresholds experience more severe stress (and potentially immediate damage). For example, the function used for computing the W in the following sections is:

$$W = e^{0.1(T^{1.01} - 373)} + 1,$$

where T is the temperature in Kelvin. In some embodiments, while computing W for $T_1$ and $T_2$, the average $T = (T_1 + T_2)/2$ is computed. Thus, the weighted differential LOC value is the product of the differential LOC value and W. (Note that the $t^2$ term in the equation for the differential LOC value can be multiplied by its own separate weight factor W', which can be used to adjust the relative contributions of $T_1 - T_2$ and t to the differential LOC value.) In an exemplary embodiment, W remains near 1 until the temperature reaches approximately 330° K (57° C.), at which point W begins to increase in value. Moreover, above approximately 360° K (87° C.), W may increase very rapidly in value.

Figure 2C:
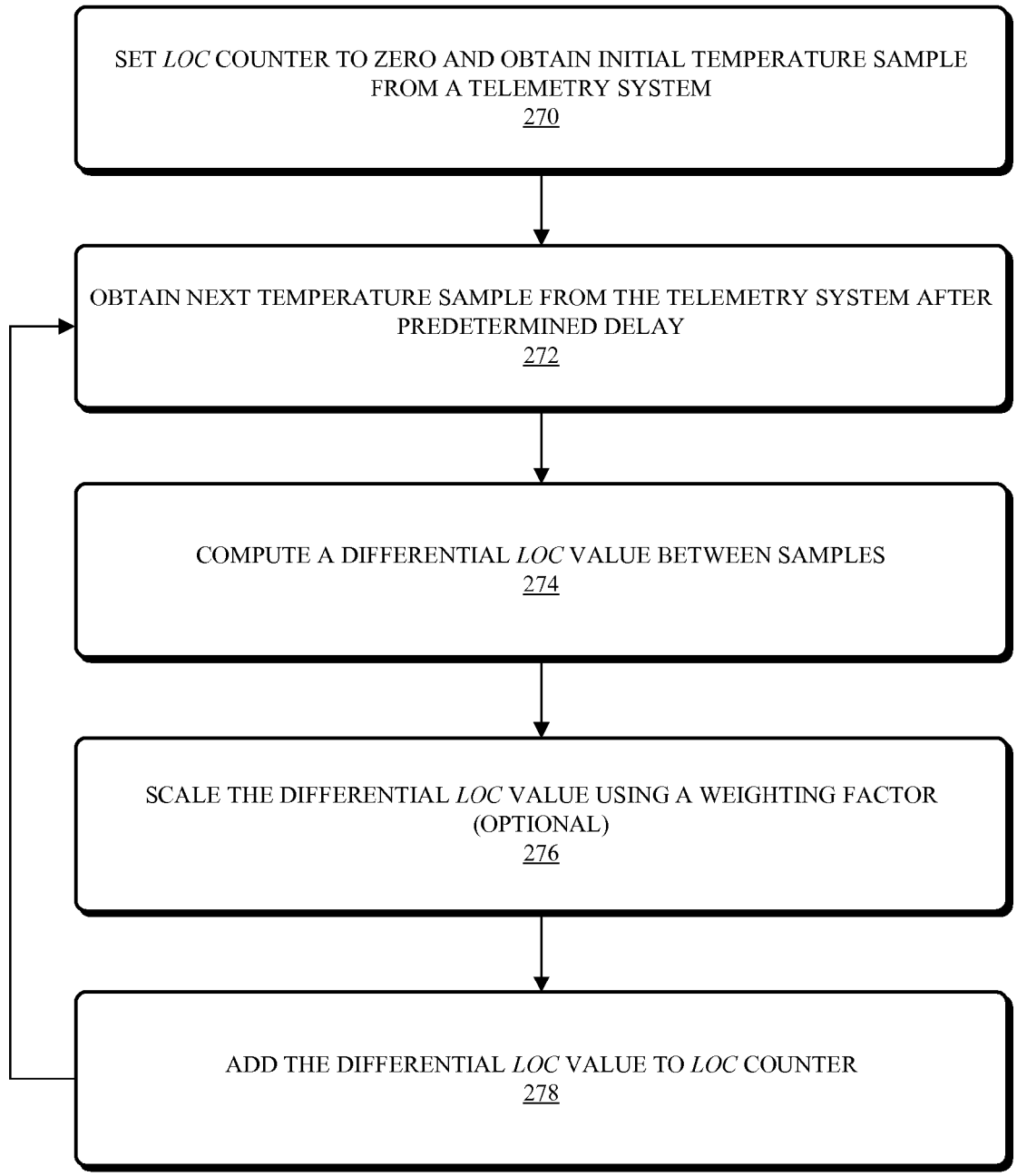
FIG. 2C is a flow chart illustrating a process for determining a cumulative length-of-curve (LOC) value in accordance with an embodiment of the present invention.

FIG. 2C presents a flow chart illustrating an embodiment of a process 260 for determining a differential LOC value, which can be implemented by the system. During operation, the system sets the LOC counter to zero and obtains an initial temperature sample from a telemetry system (270). Next, the testing system obtains a second temperature sample from the telemetry system after a predetermined delay (272). In some embodiments, the pre-determined delay is seconds, while in other embodiments the pre-determined delay is another increment of time, such as: a millisecond, a pre-determined number of seconds, an hour, and/or a day. For example, the system may obtain the initial temperature sample at time T=(N)s and then may obtain the next temperature sample at time T=(N+1)s.

Then, the system computes a differential LOC value between the temperature samples (274), and optionally scales the differential LOC value using a weighting factor (276). Additionally, the system adds the differential LOC value (with or without the scaling) to the LOC counter (278). This sequence of computations generates a cumulative LOC value for the given computer system (or a component in the given computer system) as a function of time.

After adding the differential LOC value to the LOC counter, the system returns to operation 272 to obtain the next sample from the telemetry system after a predetermined delay. Then, the system repeats the LOC-computation process using the newly collected sample. For example, if the first to samples were $T_1$ and $T_2$, the system collects a new sample $T_3$ and computes the next differential LOC value using samples $T_2$ and $T_3$.

Note that in some embodiments of processes 200 (FIG. 2A), 230 (FIG. 2B), and/or 260 there may be additional or fewer operations. Moreover, the order of the operations may be changed, and two or more operations may be combined into a single operation.

Figure 3A:
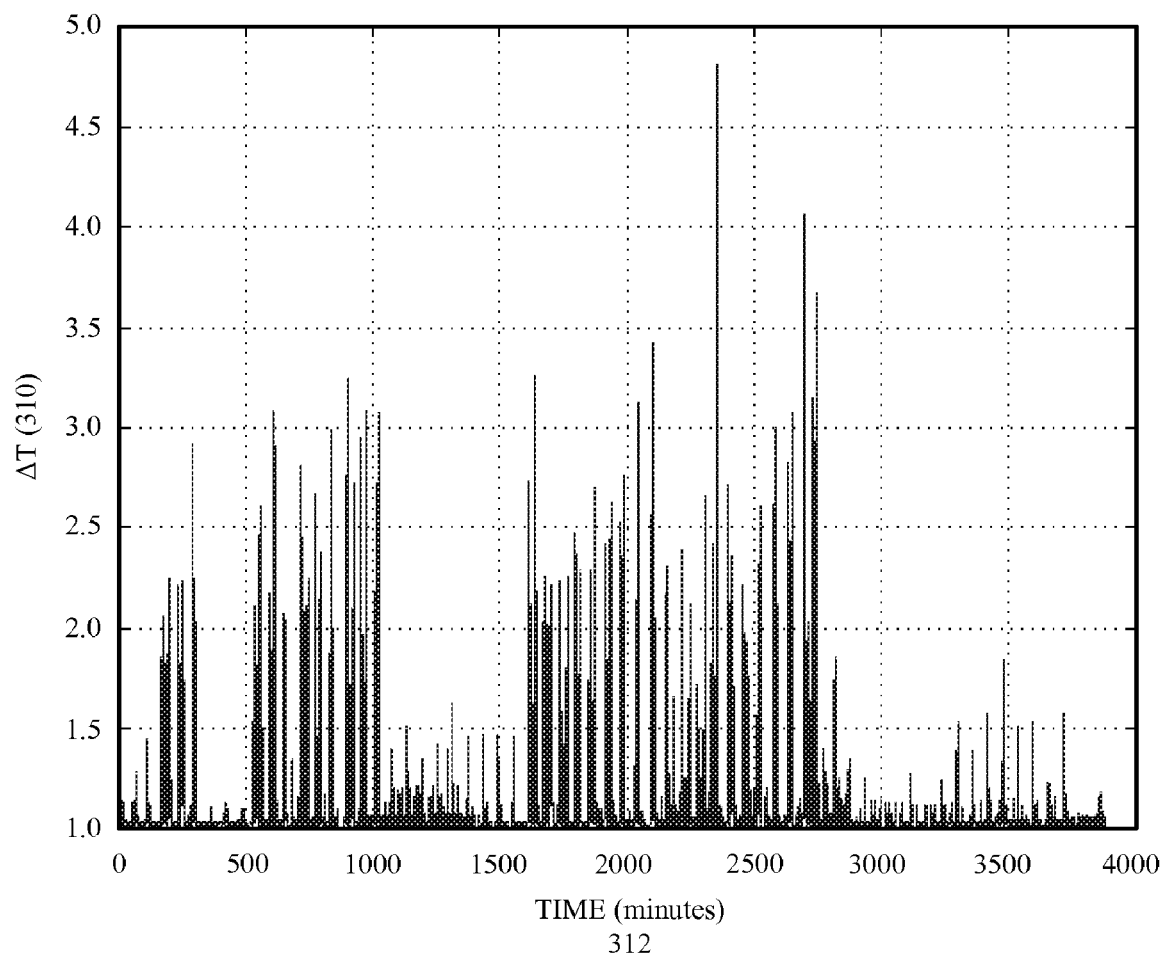
FIG. 3A is a graph illustrating differential LOC values in accordance with an embodiment of the present invention.

FIG. 3A presents a graph 300 illustrating an embodiment of differential LOC values $\Delta T$ 310 for a system board as a function of time 312 (in minutes). These differential LOC values correspond to temperature changes between sampling times during a sequence of different stress-test combinations and cycling times.

Figure 3B:
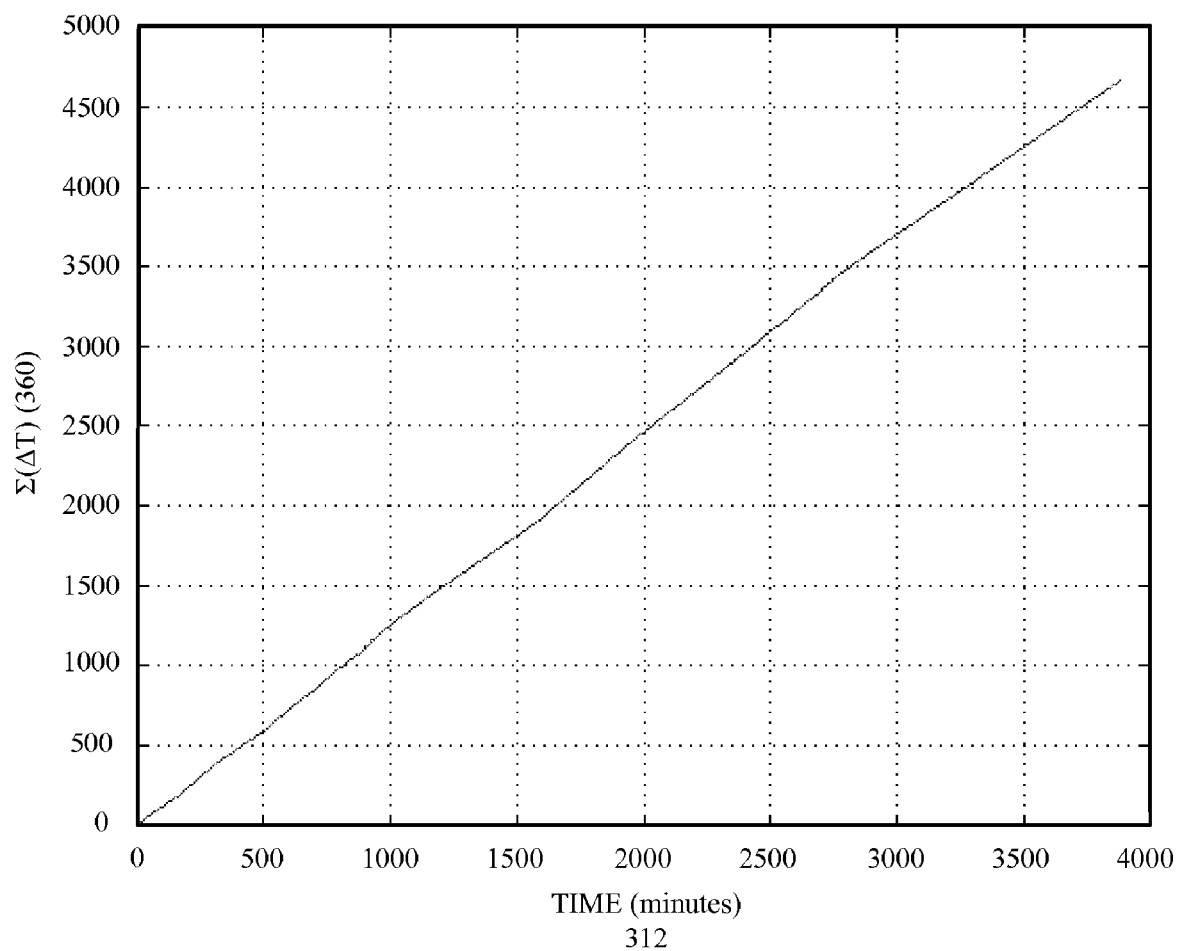
FIG. 3B is a graph illustrating cumulative LOC values in accordance with an embodiment of the present invention.

Moreover, FIG. 3B presents a graph 350 illustrating an embodiment of cumulative LOC values $\Sigma(\Delta T)$ 360 as a function of time 312 (in minutes). In graph 350, the cumulative LOC values $\Sigma(\Delta T)$ 360 increase approximately linearly to a value around 4650.

Figure 4:
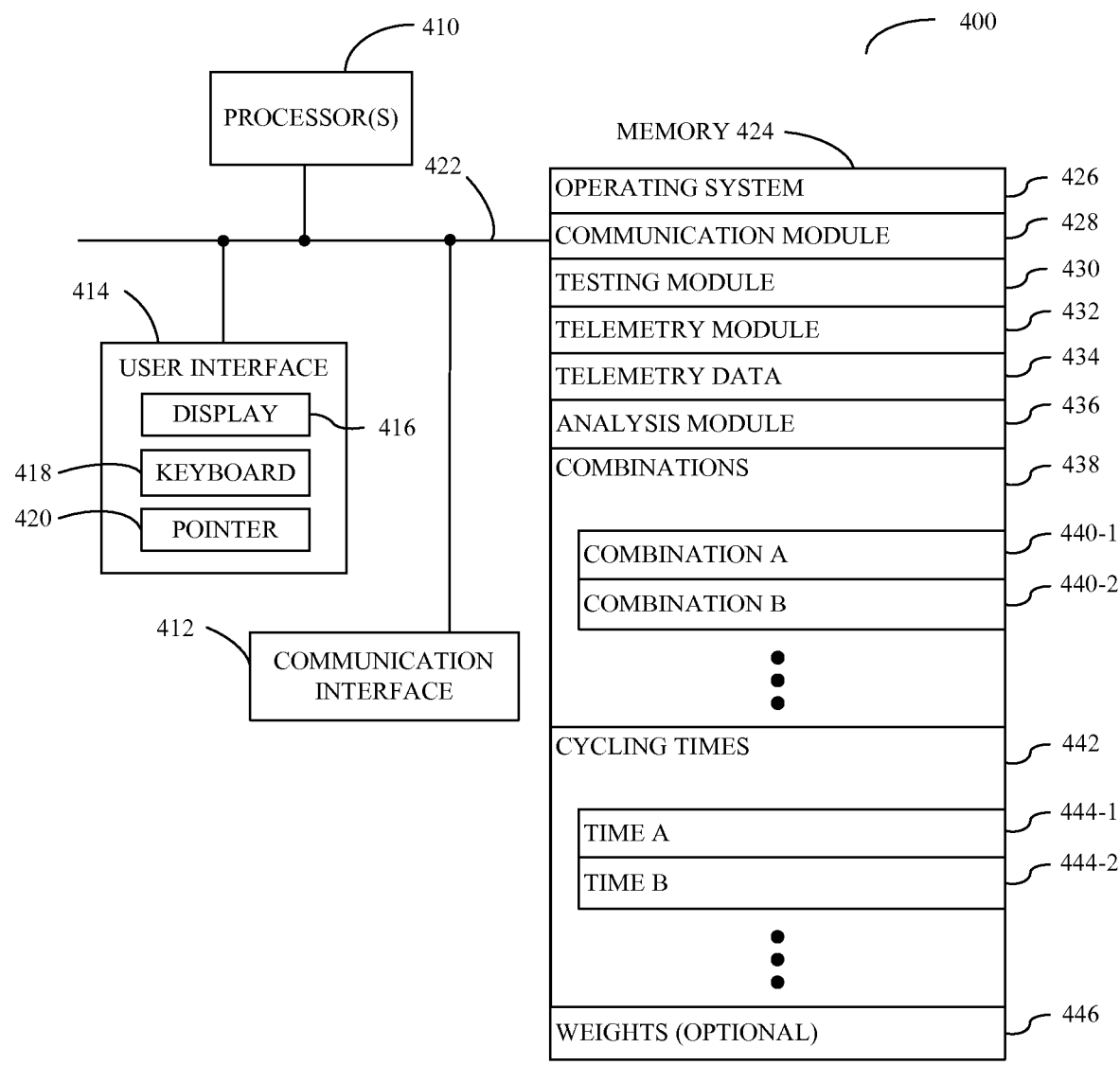
FIG. 4 is a block diagram illustrating a computer system in accordance with an embodiment of the present invention.

We now describe embodiments of a computer system that can implement one or more of the aforementioned processes. FIG. 4 presents a block diagram illustrating an embodiment of computer system 400, such as the system. Computer system 400 includes: one or more processors (or processor cores) 410, a communication interface 412, a user interface 414, and/or one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware dependent tasks. Moreover, memory 424 may also store communications procedures (or a set of instructions) in a communication module 428. These communication procedures may be used for communicating with one or more computers, devices and/or servers, including computers, devices and/or servers that are remotely located with respect to the computer system 400.

Memory 424 may also include one or more program modules (or a set of instructions), including testing module 430 (or a set of instructions), telemetry module 432 (or a set of instructions), and/or analysis module 436 (or a set of instructions). Testing module 430 may instruct the given computer system to perform one or more combinations 438 of stress tests, such as combination A 440-1 and/or combination B 440-2. These stress tests may be performed for different cycling times 442, such as cycling time A 444-1 and/or cycling time B 444-2.

During the testing, telemetry module 432 may collect telemetry data 434, such as temperature as a function of time, from sensors in the given computer system. Moreover, analysis module 436 may analyze this telemetry data to determine stress metrics, such as differential LOC values and/or cumulative LOC values, that are used to identify the optimal combination of stress tests for the given computer system. In some embodiments, at least some of the differential LOC values are weighted using optional weights 446.

Instructions in the various modules in the memory 424 may be implemented in a high-level procedural language, an object-oriented programming language, and/or in an assembly or machine language. The programming language may be compiled or interpreted, i.e, configurable or configured to be executed by the one or more processors 410.

Although the computer system 400 is illustrated as having a number of discrete components, FIG. 4 is intended to be a functional description of the various features that may be present in the computer system 400 rather than as a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more ASICs and/or one or more digital signal processors DSPs.

Computer system 400 may include fewer components or additional components. Moreover, two or more components may be combined into a single component and/or a position of one or more components may be changed. In some embodiments, the functionality of computer system 400 may be implemented more in hardware and less in software, or less in hardware and more in software, as is known in the art.

Figure 5:
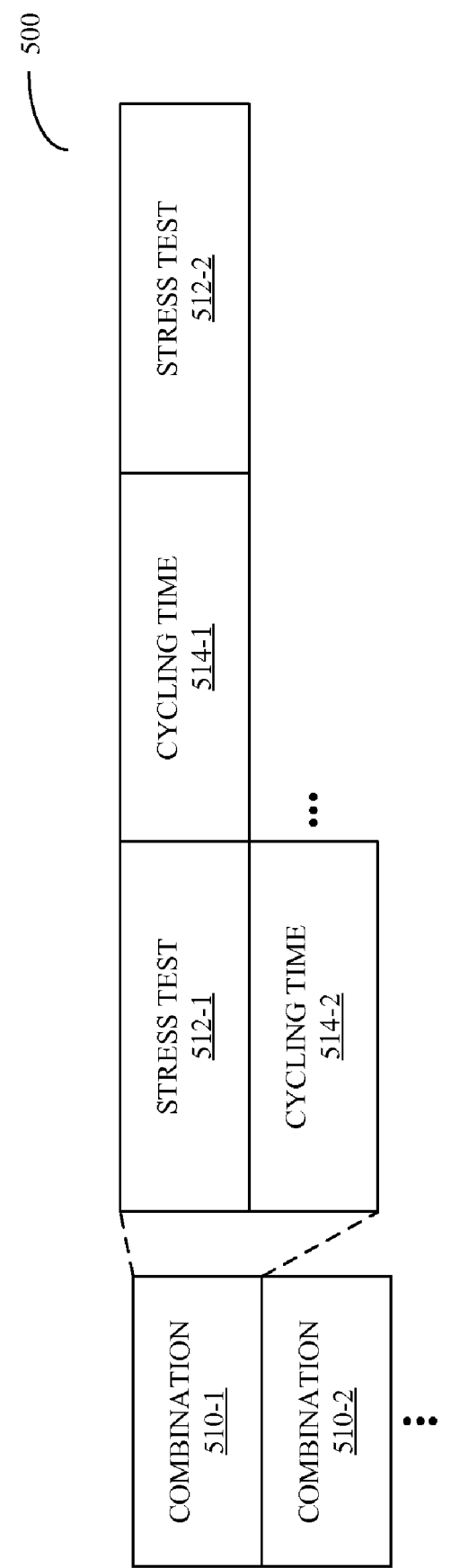
FIG. 5 is a block diagram illustrating a data structure in accordance with an embodiment of the present invention.

We now discuss data structures that may be used in the computer systems 100 (FIG. 1) and/or 400 (FIG. 4). FIG. 5 presents a block diagram illustrating an embodiment of a data structure. This data structure may include combinations 510 of stress tests. More specifically, a given instance of the combinations 510, such as combination 510-1, may include one or more stress tests 512 and associated cycling times 514.

Note that that in some embodiments of data structure 500 there may be fewer or additional components. Moreover, two or more components may be combined into a single component, and/or a position of one or more components may be changed.

While the preceding discussion has described selecting an optimal stress test(s) and/or combination of stress tests for the given computer system, in other embodiments this technique is used to select the optimal stress test or combination of stress tests for one or more components in the given computer system and/or one or more applications that execute on the given computer system. Moreover, in some embodiments, the system is the given computer system, i.e., the given computer system is used to determine the optimal stress test(s) and/or combinations of stress tests, and to perform self-testing and/or diagnostics.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selecting tests to stress test a computer system, comprising:
    testing the computer system using a set of tests, wherein a given test includes a given load and a given cycling time selected from a range of cycling times;
    for the given test, monitoring a stress metric in the computer system,
        wherein the stress metric is determined from temperature samples measured at different locations in the computer system, and
        wherein at least some of the temperature samples are multiplied by an associated weight when determining the stress metric; and
    selecting at least one of the tests from the set of tests to stress test the computer system based on the monitored stress metric.

2. The method of claim 1, wherein the given cycle time for the given load can include an idle time, during which the given load is not executed.

3. The method of claim 1, wherein the given load includes an application.

4. The method of claim 3, wherein the application is configured to stress a portion of the computer system.

5. The method of claim 4, wherein the portion of the computer system includes one or more of the following: a processor, memory, an application-specific integrated circuit, an input/output interface, or a disk drive.

6. The method of claim 1, wherein the selected test corresponds to the worst-case monitored stress metric.

7. The method of claim 1, wherein the selected test is used during reliability or failure-analysis testing of the computer system.

8. The method of claim 1, wherein tests are selected for different types of computer systems, and wherein a given selected test is subsequently used for a given type of computer system.

9. The method of claim 1, wherein the stress metric includes thermal dynamics of the computer system.

10. The method of claim 1, wherein the determination of the stress metric involves:
    computing a length of a line between adjacent temperature samples, wherein the line includes a component that is proportionate to a difference between values of the adjacent temperature samples and a component that is proportionate to a time interval between the adjacent temperature samples; and
    adding the computed length to a cumulative length variable, which is used as the stress metric.

11. The method of claim 10, wherein the computed length is adjusted based on a function of the magnitude of the adjacent temperature samples.

12. The method of claim 11, wherein the adjustment involves multiplying the length of the lines by an associated weight.

13. The method of claim 10, wherein computing the length of the line between adjacent temperature samples involves computing $\sqrt{|S_1-S_2|^2+t^2}$, where $S^1$ and $S^2$ are magnitudes of the adjacent temperature samples and t is the magnitude of the time interval between the adjacent temperature samples.

14. The method of claim 10, wherein the temperature samples are measured at pre-determined time intervals.

15. A computer-program product for use in conjunction with a computer system, the computer program product comprising a computer-readable storage medium and a computer-program mechanism embedded therein for selecting tests to stress test a computer system, the computer-program mechanism including:
    instructions for testing the computer system using a set of tests, wherein a given test includes a given load and a given cycling time selected from a range of cycling times;
    for the given test, instructions for monitoring a stress metric in the computer system,
        wherein the stress metric is determined from temperature samples measured at different locations in the computer system, and
        wherein at least some of the temperature samples are multiplied by an associated weight when determining the stress metric; and
    instructions for selecting at least one of the tests from the set of tests to stress test the computer system based on the monitored stress metric.

16. An apparatus, comprising:
    a processor;
    memory; and
    a program module, wherein the program module is stored in the memory and configured to be executed by the processor, the program module including:
        instructions for testing the computer system using a set of tests, wherein a given test includes a given load and a given cycling time selected from a range of cycling times;
        for the given test, instructions for monitoring a stress metric in the computer system,
            wherein the stress metric is determined from temperature samples measured at different locations in the computer system, and
            wherein at least some of the temperature samples are multiplied by an associated weight when determining the stress metric; and
        instructions for selecting at least one of the tests from the set of tests to stress test the computer system based on the monitored stress metric.

* * * * *

UNITED STATES PATENT AND TRADEMARK OFFICE
CERTIFICATE OF CORRECTION

| | | |
|---|---|---|
| PATENT NO. | : 7,725,292 B2 | |
| APPLICATION NO. | : 11/874073 | |
| DATED | : May 25, 2010 | |
| INVENTOR(S) | : Kenny C. Gross et al. | |

It is certified that error appears in the above-identified patent and that said Letters Patent is hereby corrected as shown below:

In column 1, line 11, delete "7,483,816" and insert -- 7,483,816, --, therefor.

In column 3, line 57, delete "WIMAX)," and insert -- WiMAX), --, therefor.

In column 12, line 6, in claim 13, delete "$S^1$ and $S^2$" and insert -- $S_1$ and $S_2$ --, therefor.

Signed and Sealed this
Twenty-sixth Day of July, 2011

David J. Kappos
*Director of the United States Patent and Trademark Office*